(12) United States Patent
Higashiura (10) Patent No.: US 10,864,776 B2
(45) Date of Patent: Dec. 15, 2020

(54) PNEUMATIC TIRE

(71) Applicant: Sumitomo Rubber Industries, Ltd., Kobe (JP)

(72) Inventor: Kazuki Higashiura, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 264 days.

(21) Appl. No.: 15/935,619

(22) Filed: Mar. 26, 2018

(65) Prior Publication Data

US 2018/0297417 A1    Oct. 18, 2018

(30) Foreign Application Priority Data

Apr. 17, 2017   (JP) .................... 2017-081502

(51) Int. Cl.
    *B60C 11/13*    (2006.01)
    *B60C 11/03*    (2006.01)
    *B60C 11/12*    (2006.01)

(52) U.S. Cl.
    CPC ...... *B60C 11/1353* (2013.01); *B60C 11/0302* (2013.01); *B60C 11/1204* (2013.01); *B60C 11/1236* (2013.01); *B60C 2011/0369* (2013.01); *B60C 2011/0372* (2013.01); *B60C 2011/0374* (2013.01); *B60C 2011/0381* (2013.01); *B60C 2011/1213* (2013.01)

(58) Field of Classification Search
    CPC ......... B60C 2011/0358; B60C 11/1353; B60C 2011/0369
    See application file for complete search history.

(56) References Cited

U.S. PATENT DOCUMENTS

| | | | |
|---|---|---|---|
| 2009/0008011 A1* | 1/2009 | Jin ......................... | B60C 11/00 152/209.14 |
| 2010/0089509 A1* | 4/2010 | Ochi .................. | B60C 11/0306 152/209.15 |
| 2010/0252159 A1* | 10/2010 | Mukai ................. | B60C 11/0302 152/209.25 |
| 2016/0288580 A1* | 10/2016 | Higashiura ......... | B60C 11/1236 |

FOREIGN PATENT DOCUMENTS

| | | | | |
|---|---|---|---|---|
| DE | 102011055916 A1 * | 6/2013 | ........ | B60C 11/0302 |
| JP | 2016-196288 A | 11/2016 | | |

* cited by examiner

*Primary Examiner* — Robert C Dye
*Assistant Examiner* — Farah Taufiq
(74) *Attorney, Agent, or Firm* — Birch, Stewart, Kolasch & Birch, LLP (57) ABSTRACT

A pneumatic tire includes first and second tread patterns which are formed as substantially line symmetrical shape with respect to a tire equator and are shifted with respect to one another in a tire circumferential direction. Each of the first and second tread patterns is provided with lateral inclined grooves each extending axially inwardly from each tread edge to an axially inner end without reaching the tire equator. The tire is further provided with central connecting grooves each extend across the tire equator to connect lateral inclined grooves arranged on the first and second tread patterns. The central connecting grooves each include a first end and a second end such that the first end is located nearer to the tire equator than the second end and that a depth thereof decreases gradually from the first end to the second end.

11 Claims, 7 Drawing Sheets

PNEUMATIC TIRE

BACKGROUND ART

Field of the Invention

The present disclosure relates to pneumatic tires, and more particularly to a pneumatic tire which may be suitably embodied as a winter tire capable of being compatible driving performance on snow road condition and steering stability on dry road condition at a higher level.

Description of the Related Art

Japanese Unexamined Patent Application Publication 2016-196288 discloses a pneumatic tire.

The pneumatic tire includes a first tread pattern formed between a tire equator and one of tread edges and a second tread pattern formed between the tire equator and the other one of the tread edges, the first tread pattern and the second pattern being formed as substantially line symmetrical shape with respect to the tire equator and being shifted with respect to one another in a tire circumferential direction. Each of the first and second tread patterns is provided with lateral inclined grooves, inner and outer connecting grooves and central connecting grooves each extending across the tire equator to connect one of the lateral inclined grooves arranged on the first tread pattern with one of the lateral inclined grooves arranged on the second tread pattern.

Thus, the tread portion includes a row of central blocks which are divided by the lateral inclined grooves, the inner connecting grooves and the central connecting grooves, a row of middle blocks which are divided by the lateral inclined grooves, the inner connecting grooves and the outer connecting grooves and a row of shoulder blocks which are divided by the lateral inclined grooves and the outer connecting grooves and one of the tread edges.

As to improve traction and braking properties upon running on snow road condition, a configuration of sipes on the central blocks is important since the tread central region where the central blocks are arranged tends to have a larger circumferential grounding length. For example, by arranging the sipes on the central blocks such that the sipes extend along the tire axial direction (i.e. perpendicular to the tire equator), effect that the sipes scratch the snow road to increase traction effectively can be exerted.

Unfortunately, the tire disclosed by the patent application tends to show low steering stability on dry road condition (hereinafter, referred to as "dry performance").

SUMMARY OF THE INVENTION

The present disclosure has been made in view of the above circumstances and has an object to provide a pneumatic tire capable of being compatible driving performance on snow road condition and steering stability on dry road condition at a higher level.

In one aspect of the disclosure, a pneumatic tire includes a tread portion including a first tread pattern formed between a tire equator and one of tread edges and a second tread pattern formed between the tire equator and the other one of the tread edges, the first tread pattern and the second pattern being formed as substantially line symmetrical shape with respect to the tire equator and being shifted with respect to one another in a tire circumferential direction, each of the first and second tread patterns being provided with lateral inclined grooves each extending axially inwardly from the tread edge to an axially inner end located adjacent to the tire equator without reaching the tire equator, and connecting inclined grooves each having an inclination opposite to the lateral inclined grooves and connecting a pair of circumferentially adjacent lateral inclined grooves, and central connecting grooves each extending across the tire equator to connect one of the lateral inclined grooves arranged on the first tread pattern with one of the lateral inclined grooves arranged on the second tread pattern, wherein the central connecting grooves each having a depth D6 smaller than depths D3 of the lateral inclined grooves, and wherein the central connecting grooves each include a first end and a second end such that the first end is located nearer to the tire equator than the second end and that the depth D6 decreases gradually from the first end to the second end.

In another aspect of the disclosure, each of the central connecting grooves may have groove volume V6 in a range of from 52% to 62% of virtual groove volume V0 of the concerned central connecting groove, wherein the virtual groove volume V0 is measured when assuming that the concerned central connecting groove has a constant reference depth same as the lateral inclined grooves to which the concerned central connecting groove is connected.

In another aspect of the disclosure, each of the central connecting grooves may have a depth ($D6_2$) at the second end, and the depth ($D6_2$) of the second end is in a range of from 4% to 24% of the depths (D3) of the lateral inclined grooves.

In another aspect of the disclosure, the tread portion may include a row of central blocks which are divided by the lateral inclined grooves, the connecting inclined grooves and the central connecting grooves, and the central blocks may be provided with sipes extending substantially in a tire axial direction.

In another aspect of the disclosure, in a tire cross-section of a 5% inner pressure state in which the tire is mounted on a standard wheel rim with 5% pressure of a standard inner pressure, a tread profile of a surface of the tread portion may include a first arc portion having a radius R1 of curvature with the center located on a tire equatorial plane, a second arc portion having a radius R2 of curvature connected to the first arc portion at an intersection point Q1 and a third arc portion having a radius R3 of curvature connected to the second arc portion at an intersection point Q2.

In another aspect of the disclosure, the radius R2 of curvature may be in a range of from 50% to 54% of the radius R1 of curvature, and the radius R3 of curvature may be in a range of from 20% to 24% of the radius R1 of curvature, a distance L1 from the tire equator to the intersection point Q1 may be in a range of from 40% to 50% of a tread half width TW which is an axial distance from the tire equator to one of the tread edges, and a distance L2 from the tire equator to the intersection point Q2 may be in a range of from 75% to 80% of the tread half width TW.

In another aspect of the disclosure, the connecting inclined grooves may include axially inner connecting inclined grooves and axially outer connecting inclined grooves.

In another aspect of the disclosure, the tread portion may include a row of middle blocks which are divided by the lateral inclined grooves, the inner connecting inclined grooves, and the outer connecting inclined grooves and a row of shoulder blocks which are divided by the lateral inclined grooves, the outer connecting inclined grooves, and one of the tread edges, the middle blocks are provided with sipes extending substantially parallel with the inner connecting inclined grooves, and the shoulder blocks may be provided with sipes extending substantially perpendicular to the outer connecting inclined grooves.

Typically, shapes of tires under the 5% inner pressure approximately correspond to shapes of the tires placed in tire vulcanizing molds. Thus, by specifying molding surfaces of a tire vulcanizing mold, a tire shape under the 5% inner pressure state can be controlled.

In this application including specification and claims, various dimensions, positions and the like of the tire refer to those under the 5% inner pressure state unless otherwise noted.

As used herein, the above-mentioned tread edges are the axial outermost edges of the ground contacting patch of the tread portion which occurs under a normally inflated loaded condition. As used herein, the normally inflated loaded condition is such that the tire is mounted on a standard wheel rim and inflated to a standard pressure and loaded with a standard load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

In case of passenger car tires, however, the standard pressure is uniformly defined by 180 kPa.

As used herein, the standard load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

DESCRIPTION OF THE PREFERRED EMBODIMENTS

An embodiment of the present invention will be explained below with reference to the accompanying drawings.

Figure 1:
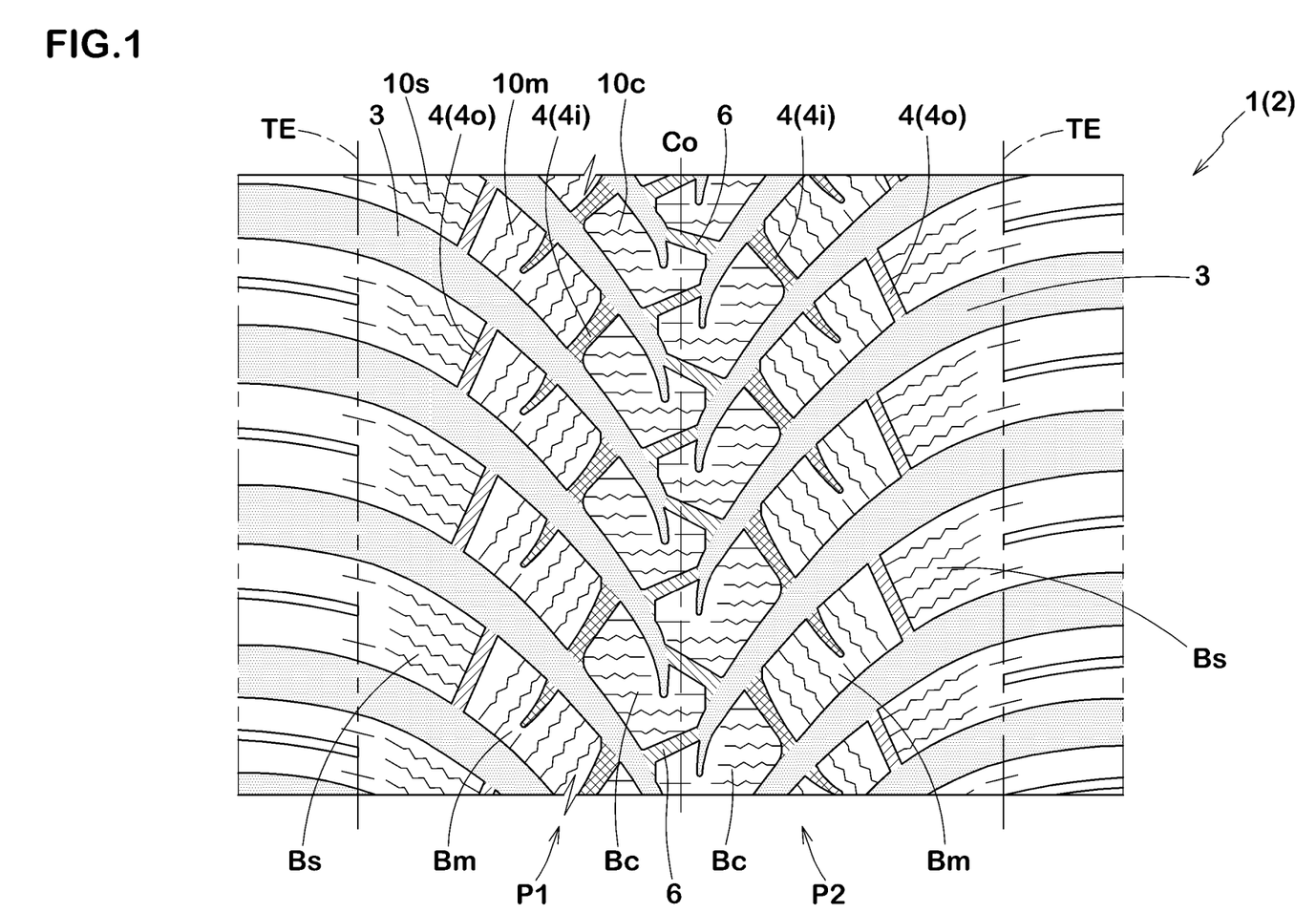
FIG. 1 is a development view of a tread pattern of a pneumatic tire according to an embodiment of the present disclosure.

As illustrated in FIG. 1, a pneumatic tire 1 according to the present embodiment, for example, is embodied as a winter tire that includes a tread portion 2 where any circumferentially and continuously extending straight main grooves are not provided.

The tread portion 2 includes a first tread pattern P1 formed between a tire equator Co and one of tread edges TE, and a second tread pattern P2 formed between the tire equator Co and the other one of the tread edges TE. The first tread pattern P1 and the second pattern P2 are formed as substantially symmetrical design with respect to the tire equator Co and are shifted with respect to one another in a tire circumferential direction (i.e. pattern phases thereof being shifted one another in the tire circumferential direction).

Each of the first tread pattern P1 and the second tread pattern P2 is provided with lateral inclined grooves 3 spaced in the tire circumferential direction from each other, and at least one connecting inclined groove 4 provided on each land portion between a pair of lateral inclined grooves 3 circumferentially adjacent. In this embodiment, as the at least one connecting inclined groove 4, an axially inner connecting inclined groove 4i and an axially outer connecting inclined groove 4o arranged axially outwardly of the inner connecting inclined groove 4i are provided on each land portion.

Furthermore, the tread portion 2 is provided with central connecting grooves 6 each of which connects one of the lateral inclined grooves 3 arranged on the first tread pattern P1 with one of the lateral inclined grooves 3 arranged on the second tread pattern P1.

Thus, the tread portion 2 includes a row of central blocks Bc which are divided by the lateral inclined grooves 3, the inner connecting grooves 4i and the central connecting grooves 6, a pair of rows of middle blocks Bm which are divided by the lateral inclined grooves 3, the inner connecting inclined grooves 4i and the outer connecting inclined grooves 4o, and a pair of rows of shoulder blocks Bs which are divided by the lateral inclined grooves 3 and the outer connecting inclined grooves 4o and one of the tread edges TE.

Figure 2:
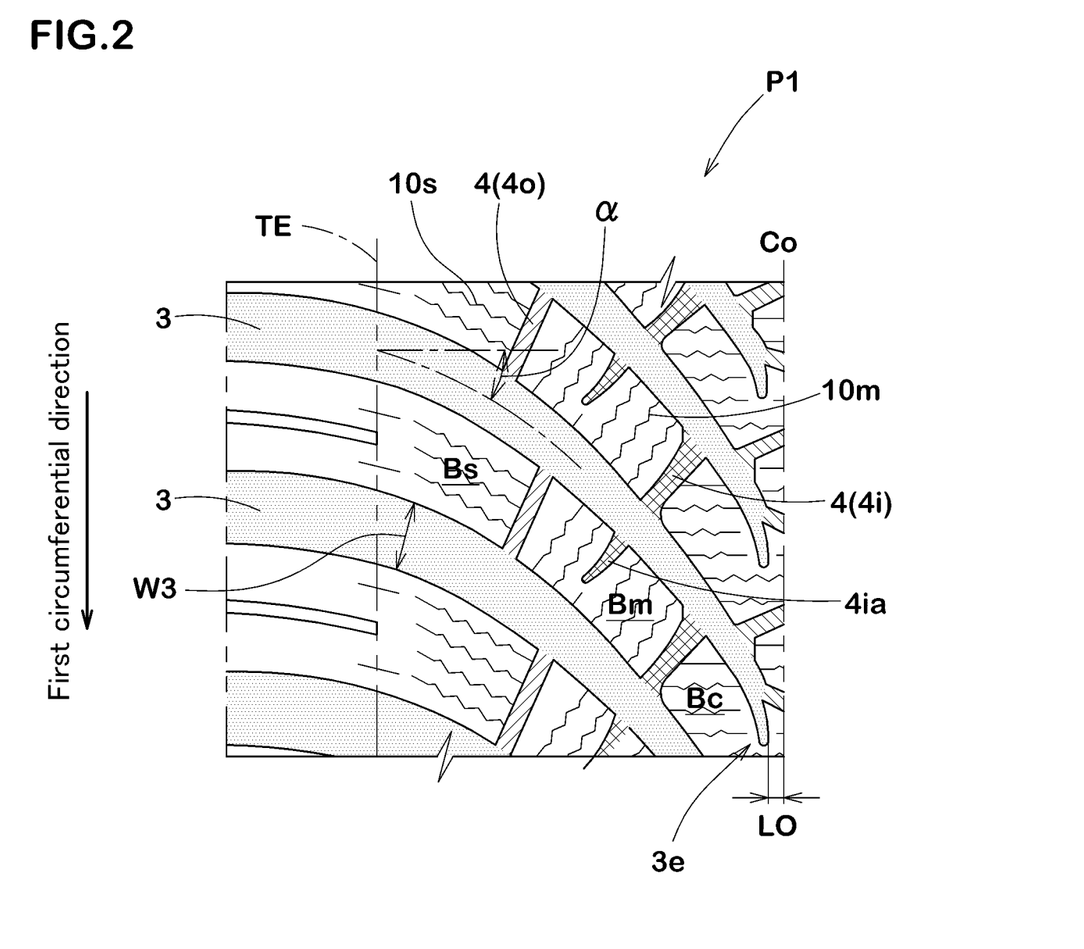
FIG. 2 is a partial enlarged development view of a tread pattern at one side of a tire equator as a representative.

FIG. 2 illustrates the first tread pattern P1 as a representative. As illustrated in FIG. 2, the lateral inclined grooves 3 extend axially inwardly from a region located axially outside the tread edge TE to axially inner ends 3e which are adjacent to the tire equator Co, but without reaching the tire equator Co while inclining toward a first circumferential direction (e.g. a tire rotational direction) toward axially inwardly. In this embodiment, the lateral inclined grooves 3 are configured as curved grooves which have angles α gradually increasing toward axially inwardly with respect to the tire axial direction. Further, the lateral inclined grooves 3 may be configured to have widths W3 thereof decrease toward axially inwardly. Thus, the lateral inclined grooves 3 can form snow columns therein with high strength that increases toward axially outwardly upon running on snow road, resulting in improving effectively cornering performance on snow road condition as well as discharging property of snow therefrom.

Note that the "adjacent to the tire equator" shall mean that the inner ends 3e locate in a region within 5 mm or less from the tire equator Co. Thus, distances LO from the inner ends 3e to the tire equator Co are set 5 mm or less.

The inner connecting inclined groove 4i is inclined in an opposite direction to the lateral inclined grooves 3. Further, the inner connecting inclined groove 4i may be connected to the lateral inclined grooves 3 in a 3-way junction or crossroads manner. In this embodiment, the inner connecting inclined groove 4i is connected to the lateral inclined groove 3 located in a second circumferential direction with respect to the concerned inner connecting inclined groove 4*i* in a 3-way junction manner, and is connected to the lateral inclined groove 3 located in the first circumferential direction with respect to the concerned inner connecting inclined groove 4*i* in a crossroads manner. That is, the inner connecting inclined groove 4*i* includes an extended portion 4*ia* which traverses beyond the lateral inclined grooves 3 located on a side of the first circumferential direction and terminates within another middle block Bm circumferentially adjacent.

The outer connecting inclined groove 4*o* has an opposite inclination to the lateral inclined grooves 3. The outer connecting inclined groove 4*o* has both ends each of which forms a 3-way junction with the respective lateral inclined grooves 3. Since the inclinations of inner and outer connecting inclined grooves 4*i* and 4*o* are different from that of the lateral inclined grooves 3, intersection angles of the inner and outer connecting inclined groove 4*i* and 4*o* to the lateral inclined grooves 3 tend to approach a right angle.

Figure 3:
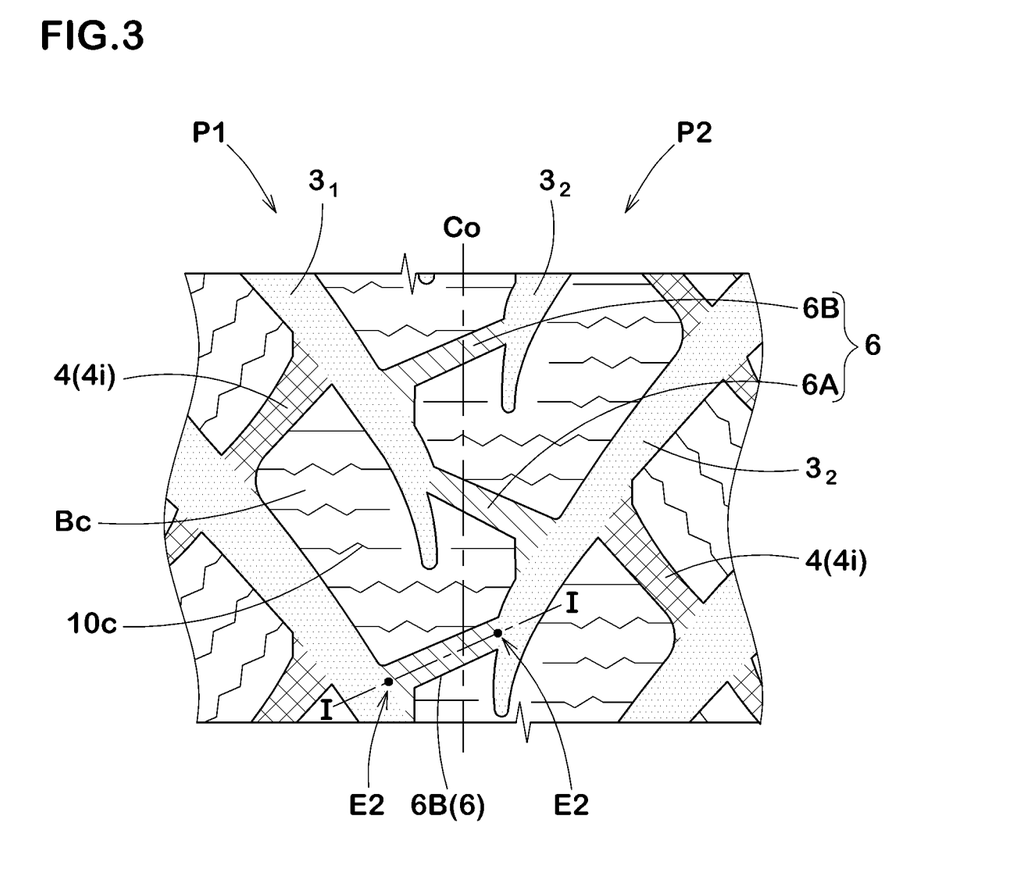
FIG. 3 is a partial enlarged development view of the tread pattern for explaining central connecting grooves.

As illustrated in FIG. 3, the central connecting grooves 6 extend across the tire equator Co, and are connected to the lateral inclined grooves 3. Specifically, each of the central connecting grooves 6 connects one of the lateral inclined grooves 3 arranged on the first tread pattern P1 with one of the lateral inclined grooves 3 arranged on the second tread pattern P2, wherein the connecting grooves 6 are arranged in a zigzag manner in the tire circumferential direction. Hereinafter, the lateral inclined grooves arranged on the first tread pattern P1 and the second tread pattern P2, respectively, may be referred to as "the lateral inclined grooves $3_1$" and "the lateral inclined grooves $3_2$" for the purpose of distinguishing from each other.

In this embodiment, the central connecting grooves 6 include first central connecting grooves 6A and second central connecting grooves 6B which are arranged alternately in the tire circumferential direction. The first central connecting grooves 6A each connect one of the lateral inclined grooves $3_1$ arranged on the first tread pattern P1 with one of the lateral inclined grooves $3_2$ arranged on the second tread pattern P2, wherein the lateral inclined groove $3_2$ is located forward in the first circumferential direction with respect to the concerned lateral inclined groove $3_1$. In this embodiment, the first central connecting grooves 6A are inclined in the same direction to the concerned lateral inclined groove $3_1$. The second central connecting grooves 6B each connect one of the lateral inclined grooves $3_1$ arranged on the first tread pattern P1 with one of the lateral inclined grooves $3_2$ arranged on the second tread pattern P2, wherein the lateral inclined groove $3_2$ is located backwardly in the first circumferential direction with respect to the concerned lateral inclined groove $3_1$. The second central connecting grooves 6B are inclined in an opposite direction to the concerned lateral inclined groove $3_1$. Note that the first central connecting groove 6A and the second central connecting groove 6B are arranged in line symmetric manner.

Since the pneumatic tire 1 in accordance with the present embodiment includes the lateral inclined grooves 3, the inner connecting grooves 4*i* and the outer connecting grooves 4*o* which are inclined with respect to the tire axial direction, these grooves 3, 4 and 5 can generate snow-shearing force in both tire axial and circumferential directions. Accordingly, the respective snow columns formed in the respective grooves 3, 4 and 5 can help in generating powerful snow shearing force when straight running, braking and cornering on snow. Furthermore, since the shearing force acts on the snow columns in different direction to the width directions of the snow columns in many traveling situations, it may be prevented that the snow pillars break easily upon running. In addition, since the inner and outer connecting grooves 4*i* and 4*o* are inclined, these connecting grooves 4*i* and 4*o* may be useful to increase the number of junctions on the lateral inclined grooves 3 as compared with a circumferential groove, and therefore the tire 1 in accordance with the present embodiment can form high strength combined snow columns through these grooves 3, 4 and 5. Furthermore, the respective high strength combined snow columns formed in the first tread pattern P1 and the second tread pattern P2 are also joined through a snow column formed in one central connecting groove 6, and then it would have more high strength. As described above, the pneumatic tire in accordance with the present embodiment may improve steering stability on snow.

In this embodiment, the tread portion 2 is not provided with any circumferentially and continuously extending straight main grooves, but is provided with the inner and outer connecting grooves 4*i* and 4*o* which have different inclination to the lateral inclined grooves 3. Thus, the shapes of the middle blocks Bm and the shoulder blocks Bs tend to approach rectangular shapes having high rigidity. As a result, the pneumatic tire according to the present embodiment may improve steering stability on dry road condition by increasing cornering power. In particular, in order to provide the blocks Bm and Bs with rectangular shapes, the angle of the inner connecting groove 4*i* with respect to the tire axial direction is preferably set smaller than that of the outer connecting groove 4*o* in view of the angle α of the lateral inclined grooves 3 which enlarges axially inwardly. In order to further improve steering stability on dry road condition, angles of the central connecting grooves 6 with respect to the tire axial direction are preferably smaller than that of the inner connecting groove 4*i*.

As illustrated in FIG. 3, in the pneumatic tire 1 according to the present embodiment, each central block Bc is provided with sipes 10*c*. As to improve traction and braking properties upon running on snow road condition, the sipes 10*c* provided on the central blocks Bc are important since a central region of a ground contact patch of the tread portion 2 tends to have a longest circumferential length. For example, by arranging the sipes 10*c* on the central blocks Bc such that the sipes 10*c* extend substantially along the tire axial direction (i.e. perpendicular to the tire equator Co), effect that the sipes scratch the snow road to increase traction effectively can be exerted.

However, in the above case, each central block Bc tends to have locally low rigidity on both circumferential end regions, leading to low steering stability on dry road condition. Further, edge effect of the sipes 10*c* tends to lower.

Figure 4:
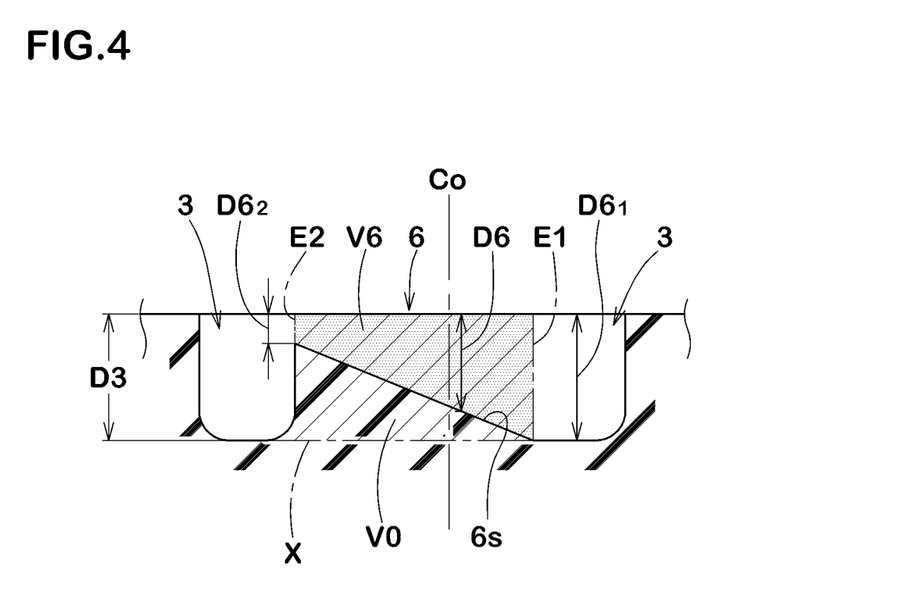
FIG. 4 is a cross-sectional view of one central connecting groove taken along a groove centerline thereof.

In this disclosure, as illustrated in FIG. 4 which is a cross-sectional view taken along line I-I of FIG. 3 (a cross-sectional view of one central connecting groove 6 taken along a groove centerline thereof), the central connecting grooves 6 are configured as shallow grooves having depths smaller than depths D3 of the lateral inclined grooves 3. Further, each of the central connecting grooves 6 includes a first end E1 and a second end E2 such that the first end E1 is located nearer to the tire equator Co than the second end E2 and that the depth D6 decreases gradually from the first end E1 to the second end E2.

As described above, the central connecting grooves 6 are configured as shallow grooves each having the depth D6 decreasing gradually from the first end E1 to the second end E2. Thus, reduction in rigidity of the central blocks Bc when the sipes 10*c* are provided thereon can be suppressed effectively, compared with by being provided with shallow grooves each with a constant depth which has the same groove volume as the above central connecting groove 6. Alternatively, this embodiment makes it possible to increase groove volume of the central connecting grooves 6 while ensuring the same effect which suppresses reduction in rigidity of the central blocks, as compared with by being provided with shallow grooves with a constant depth.

In addition, in each of the central connecting grooves 6, the depth D6 becomes deeper on the first end E1 which is located nearer to the tire equator Co than the second end E2. That is, this configuration produces large snow-shearing force on a central region around the tire equator Co which comes into contact with the ground with a larger circumferential grounding length and which has a significant influence on traction and braking on snow road condition. Thus, in cooperation with the above effect, the pneumatic tire in accordance with the present disclosure can be capable of being compatible driving performance on snow road condition and steering stability on dry road condition at a higher level, as compared with tires having central connecting grooves with constant depths.

The central connecting grooves 6 each have groove volume V6 (shown as gray color area in FIG. 4), and the groove volume V6 is preferably in a range of from 52% to 62% of virtual groove volume V0 (shown as a hatched area in FIG. 4) of the concerned central connecting groove 6 which is measured when assuming that the concerned central connecting groove 6 has a constant reference depth x same as the lateral inclined grooves 3 to which the concerned central connecting groove 5 is connected. When the groove volume V6 is less than 52% of the virtual groove volume V0, snow-shearing force tends to lower and thus the effect that improves steering stability on snow road condition may not be exerted sufficiently. When the groove volume V6 is more than 62% of the virtual groove volume V0, rigidity of the central blocks Bc tends to lower and thus the effect that improves steering stability on dry road condition may not be exerted sufficiently.

Each central connecting groove 6 has a depth $D6_2$ at the second end E2. Preferably, the depth $D6_2$ is in a range of from 4% to 24% of the depths D3 of the lateral inclined grooves 3. When being less than 4%, snow-shearing force tends to lower and thus the effect that improves steering stability on snow road condition may not be exerted sufficiently even if the above shallow grooves are employed. When being more than 24%, the effect that improves steering stability on dry road condition may not be exerted sufficiently. Note that a depth $D6_1$ at the first end E1 is equal to or less than the depth D3, e.g. equal to the depths D3 in this embodiment.

Figure 5A:
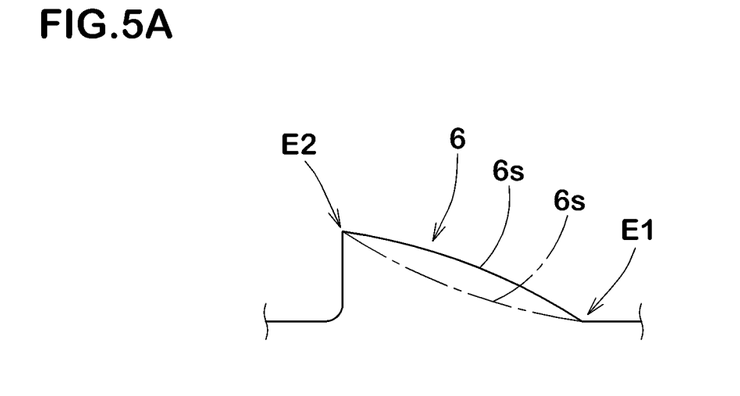
FIGS. 5A and 5B are cross-sectional views of central connecting grooves each taken along a groove centerline thereof in accordance with other examples.
Figure 5B:
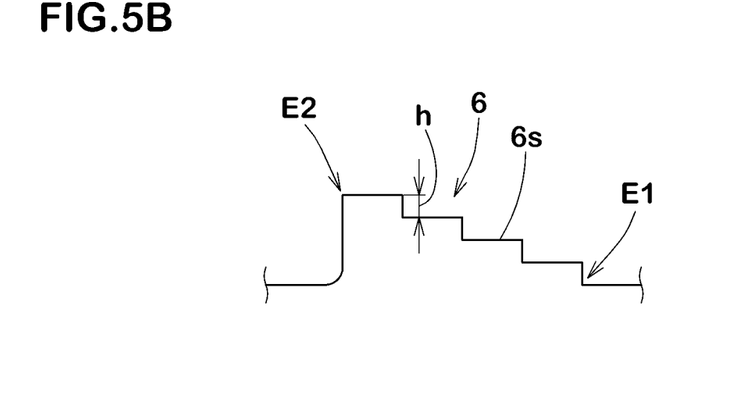

In this embodiment, the bottom 6s of each central connecting groove 6 is configured as a slant surface inclined at a constant angle so that the depth D6 decreases to the second end E2 at a fixed ratio. Alternatively, as illustrated in FIG. 5A, the bottom 6s may be configured as a curved manner, e.g. a convex arc manner or concave arc manner. In this case, the depth D6 decreases at ratios which vary gradually. Alternatively, as illustrated in FIG. 5B, the bottom 6s may be configured as a stepped surface so that the depth D6 decreases stepwise. In this case, the number of steps may preferably be two or more, more preferably three or more in order to make the height difference h between steps smaller.

Figure 6:
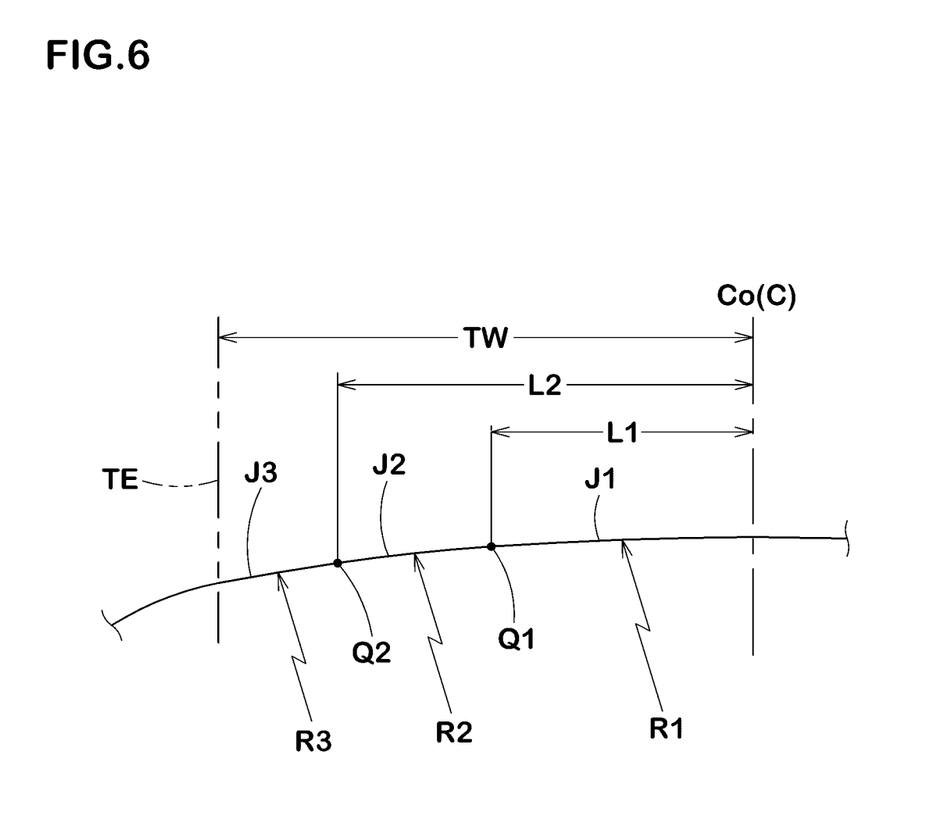
FIG. 6 is a diagram showing a tread profile of an outer surface of a tread portion.

As illustrated in FIG. 6, in a tire cross-section of the 5% inner pressure state, a tread profile of a surface of the tread portion 2 includes a first arc portion J1 having a radius R1 of curvature with the center located on a tire equatorial plane C, a second arc portion J2 having a radius R2 of curvature connected to the first arc portion J1 at an intersection point Q1, and a third arc portion J3 having a radius R3 of curvature connected to the second arc portion J2 at an intersection point Q2. The third arc portion J3 extends to at least the tread edge TE. In some preferred embodiments, the second portion J2 and the third portion are arranged on each side of the tire equator Co.

Preferably, the radius R2 of curvature is in a range of from 50% to 54% of the radius R1 of curvature, and the radius R3 of curvature is in a range of from 20% to 24% of the radius R1 of curvature. Preferably, a distance L1 from the tire equator Co to the intersection point Q1 is in a range of from 40% to 50% of a tread half width TW which is an axial distance from the tire equator Co to one of the tread edges TE. Preferably, a distance L2 from the tire equator Co to the intersection point Q2 is in a range of from 75% to 80% of the tread half width TW.

In the pneumatic tire 1 having such a tread profile, a circumferential ground contact length of the row of middle blocks Bm becomes longest when cornering given a camber angle. Thus, as illustrated in FIG. 2, sipes 10m provided on the middle blocks Bm may have great influence on cornering on snow road condition. Accordingly, in this embodiment, the sipes 10m are arranged in substantially parallel with the inner connecting inclined groove 4i, thereby functioning edge effect of the sipes 10m in the tire axial direction upon cornering, improving steering stability on snow, in particular the effect which suppresses side slip. Further, since the sipes 10m are arranged in substantially parallel with the inner connecting inclined groove 4i, high rigidity of the middle blocks Bm can be ensured, leading to steering stability on dry road condition.

In this embodiment, the shoulder blocks Bs are provided with sipes 10s extending substantially perpendicular to the outer connecting inclined groove 4o. Thus, it enables to form longer sipes which may increase traction and braking properties on snow road condition.

Further, the sipes 10c, 10m and 10s are arranged in different directions from one another, edge effect that functions to various directions can offer, leading to improve steering stability on snow road condition.

As used herein, "the sipes 10c extend substantially along the tire axial direction" shall mean that an angle between a longitudinal direction of each of the sipes 10c and the tire axial direction is equal to zero or less than 10 degrees. As used herein, "the sipes 10m are arranged in substantially parallel with the inner connecting inclined groove 4i" shall mean that an angle between a longitudinal direction of each of the sipes 10m and a groove centerline of the inner connecting inclined groove 4i is equal to zero or less than 10 degrees. As used herein, the "sipes 10s extending substantially perpendicular to the outer connecting inclined groove 4o" shall mean that an angle between a longitudinal direction of each of the sipes 10s and a groove centerline of the outer connecting inclined groove 4o is in a range of from 80 to 90 degrees.

Figure 7:
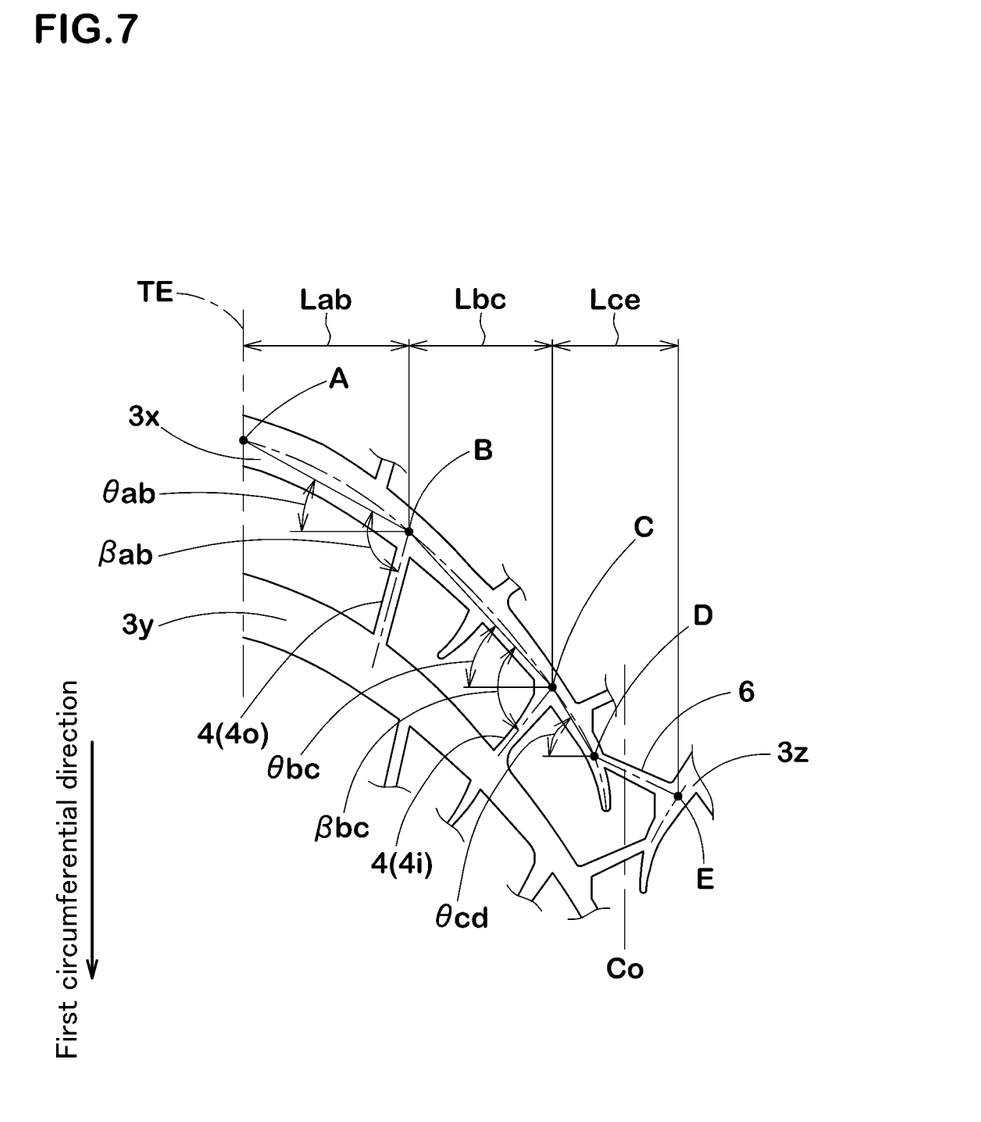
FIG. 7 is a partial development view of the tread pattern showing intersection points A to E.

As illustrated in FIG. 7, in the pneumatic tire 1 in accordance with the present embodiment, an angle θab with respect to the tire axial direction of a segment AB extending between intersection points A and B, an angle θbc with respect to the tire axial direction of a segment BC extending between intersection points B and C, and an angle θcd with respect to the tire axial direction of a segment CD extending between intersection points C and D satisfy the following relations:

θab<θbc<θcd, 25 (deg.)<θab<35 (deg.), 45 (deg.)<θbc<55 (deg.), and 55 (deg.)<θcd<65 (deg.).

Here, the intersection points A to D are defined as follows. In FIG. 7, a pair of lateral inclined grooves 3x and 3y on the first tread pattern P1 is illustrated wherein the lateral inclined groove 3y is located forwardly in the first circumferential direction with respect to the lateral inclined groove 3x. Further, one lateral inclined groove 3z which is arranged on the second tread pattern P2 and is located forwardly in the first circumferential direction with respect to the lateral inclined groove 3x is also illustrated in FIG. 7.

The intersection point A is defined as a point where the lateral inclined groove 3x intersects the tread edge TE.

The intersection point B is defined as a point where the outer connecting inclined groove 4o which connects the lateral inclined groove 3x and the lateral inclined groove 3y intersects the lateral inclined groove 3x.

The intersection point C is defined as a point where the inner connecting inclined groove 4i which connects the lateral inclined groove 3x and the lateral inclined groove 3y intersects the lateral inclined groove 3x.

The intersection point D is a point where the central connecting groove 6 which connects the lateral inclined groove 3x and the lateral inclined groove 3z intersects the lateral inclined groove 3x.

The intersection point E is defined as a point where the central connecting groove 6 which connects the lateral inclined groove 3x and the lateral inclined groove 3z intersects the lateral inclined groove 3z.

Further, the intersection points A to E are defined using the groove centerlines of the respective grooves 3 to 6.

In the pneumatic tire 1 in accordance with the present embodiment, an axial length Lab of the segment AB, an axial length Lbc of the segment BC, an axial length Lce of a segment CE and the tread half width TW satisfy the following relations:

Lab>Lbc>Lce, 0.138×W≤Lab≤0.169×W, 0.118×W≤Lbc≤0.149×W, and 0.097×W≤Lce≤0.128×W.

Since the angles θab, θbc and θcd satisfy the above-mentioned relationship, steering stability on dry and snow road conditions can be improved in well-balanced manner. When the angles θab, θbc and θcd are less than the above ranges, steering stability on snow road condition may deteriorate due to reduction of lateral grip using snow columns. On the other hand, when the angles θab, θbc and θcd are more than the above ranges, steering stability on dry road condition may deteriorate due to reduction of block lateral rigidity. In particular, when the angle θab is excessively large, ground followability of a rear tire may deteriorate upon cornering on dry road condition. Furthermore, when the angle θcd is excessively large, steering response of a front tire may deteriorate.

In the same point of view, since the lengths Lab, Lbc and Lce satisfy the above-mentioned relationship, steering stability on dry and snow road conditions can be improved in well-balanced manner. When the lengths Lab, Lbc and Lcd are more than the above ranges, steering stability on snow road condition may deteriorate due to reduction of lateral grip using snow columns. On the other hand, the lengths Lab, Lbc and Lce are less than the ranges, steering stability on dry road condition may deteriorate due to reduction of block lateral rigidity. In particular, when the length Lab is excessively small, ground followability of a rear tire may deteriorate upon cornering on dry road condition. Furthermore, when the length Lce is excessively small, steering response of a front tire may deteriorate.

Since the inner connecting groove 4i includes the extended portion 4ia, strength of the combined snow pillar can further be enhanced. In addition, since the extended portion 4ia terminates within the middle block Bm, the block rigidity may be maintained so that steering stability on dry road condition is maintained.

Further, in order to improve steering stability on dry road condition, an angle βab formed between the segment AB and the outer connecting groove 4o is preferably in a range of from 90 to 120 degrees. In the same point of view, the angle βbc formed between the segment BC and the inner connecting groove 4i is preferably in a range of from 90 to 120 degrees. When the angles βab and βbc are out of the above ranges, steering stability on dry road condition may deteriorate due to reduction of block rigidity.

Preferably, the pneumatic tire 1 has a land ratio of the tread pattern in a range of from 55% to 75% as same as the conventional winter tires. As used herein, the land ratio shall mean a ratio S/Sa of a ground contact area "S" of total land portions between the tread edges TE to a virtual ground contact area "Sa" of the tread portion between the tread edges TE where all grooves are filled up. Furthermore, the tread rubber preferably has a durometer type-A hardness at 23 degrees Celsius in a range of from 45 to 70 degrees. In addition, the lateral inclined grooves 3, inner connecting groove 4i, outer connecting grooves 4o and central connecting grooves 6 preferably have depths in a range of from 5.0 to 6.0 mm.

While the embodiments in accordance with the present invention have been described in detail, the present invention is not limited to the illustrated embodiments, but can be modified and carried out in various aspects.

EXAMPLE

Winter tires having a basic tread pattern illustrated in FIG. 1 and a size of 195/65R15 were manufactured based on details shown in Table 1, and then steering stability on dry and snow road conditions of each tire was tested.

Each test tire has the same configuration except the details shown in Table

Land ratio: 68%

Tread ground contact width (2×TW): 140 mm

Groove depths: 8.5 mm

Tread rubber hardness of durometer type-A: 65 degrees

Test for steering stability on dry road condition:

Each test tire was mounted on a passenger car, GOLF 7.0 made by Volkswagen, having a displacement of 2,000 cc as all the wheels under the following conditions. Then, a test driver drove the test car on a test course of a dry asphalt road, and evaluated the steering stability such as steering response by his feeling. The test results are indicated in Table 1 using a point score system of a maximum 10. The larger the value, the better the performance is.

Test for Steering Stability and Traction on Snow Road Condition:

A test driver drove the above test car on a test course covered with snow, and evaluated the steering stability including lateral grip performance upon cornering by his feeling. As to traction performance on snow road condition, the test driver evaluated traction and braking performance on the above snow road condition by his feeling. Each test result is indicated in Table 1 using a point score system of a maximum 10. The larger the value, the better the performance is.

TABLE 1

| | Ex.1 | Ex. 2 | Ex. 3 | Ex. 4 | Ref. 1 | Ref. 2 | Ex. 5 | Ex. 6 | Ex. 7 | Ex. 8 | Ref. 3 | Ref. 4 | Ref. 5 | Ref. 6 | Ref. 7 |
|---|---|---|---|---|---|---|---|---|---|---|---|---|---|---|---|
| <Central connecting grooves> | | | | | | | | | | | | | | | |
| Depths D6 | varying | | | | constant | | varying | | | | const. | const. | const. | const. | const. |
| D61/D3 (%) | 100 | 100 | 100 | 100 | 44 | 14 | 100 | 100 | 100 | 100 | 60 | 44 | 44 | 44 | 44 |
| D62/D3 (%) | 14 | 4 | 14 | 24 | 44 | 100 | 14 | 14 | 14 | 14 | 60 | 44 | 44 | 44 | 44 |
| Groove volume ratio V6/V0 (%) | 56 | 56 | 52 | 62 | 56 | 56 | 56 | 56 | 56 | 56 | 40 | 56 | 56 | 56 | 56 |
| <Central blocks> | | | | | | | | | | | | | | | |
| Sipe directions (deg.) *1 | 0 | 0 | 0 | 0 | 0 | 0 | 0 | 0 | 0 | 0 | 0 | 20 | 0 | 0 | 0 |
| <Tread profile> | | | | | | | | | | | | | | | |
| Radius ratio R2/R1 (%) | 52 | 52 | 52 | 52 | 52 | 52 | 50 | 52 | 52 | 54 | 52 | 52 | 45 | 30 | 60 |
| Radius ratio R3/R1 (%) | 22 | 22 | 22 | 22 | 22 | 22 | 20 | 22 | 22 | 24 | 22 | 22 | 15 | 15 | 35 |
| Ratio L1/TW (%) | 45 | 45 | 45 | 45 | 45 | 45 | 45 | 40 | 45 | 45 | 45 | 45 | 35 | 35 | 45 |
| Ratio L2/TW (%) | 77 | 77 | 77 | 77 | 77 | 77 | 77 | 77 | 80 | 77 | 77 | 77 | 77 | 77 | 85 |
| Steering stability on dry | 10 | 10 | 10 | 9 | 8 | 7 | 10 | 10 | 10 | 10 | 9 | 9 | 8 | 8 | 7 |
| Steering stability on snow | 10 | 10 | 9 | 10 | 8 | 8 | 9 | 9 | 9 | 9 | 8 | 8 | 8 | 8 | 8 |
| Traction on snow | 10 | 9 | 9 | 10 | 10 | 10 | 10 | 10 | 10 | 10 | 8 | 8 | 8 | 8 | 10 |

*1) angles to tire axial direction

As shown in Table 1, it is confirmed that the example tires improve total performance of steering stability on dry and snow road conditions, and are compatible both performances at a higher level.

What is claimed is:

1. A pneumatic tire comprising:
a tread portion comprising a first tread pattern formed between a tire equator and one of tread edges and a second tread pattern formed between the tire equator and the other one of the tread edges, the first tread pattern and the second pattern being formed as a substantially line symmetrical shape with respect to the tire equator and being shifted with respect to one another in a tire circumferential direction;
each of the first and second tread patterns being provided with
lateral inclined grooves each extending axially inwardly from the tread edge to an axially inner end located adjacent to the tire equator without reaching the tire equator, and
connecting inclined grooves each having an inclination opposite to the lateral inclined grooves and connecting a pair of circumferentially adjacent lateral inclined grooves; and
central connecting grooves each extending across the tire equator to connect one of the lateral inclined grooves arranged on the first tread pattern with one of the lateral inclined grooves arranged on the second tread pattern,
wherein the central connecting grooves each comprise a first end and a second end such that the first end is located nearer to the tire equator than the second end and that a depth (D6) of each central connecting groove decreases gradually from the first end to the second end, and
the first end has a depth that is the same as the depth of the lateral inclined groove to which the first end is connected.

2. The pneumatic tire according to claim 1, wherein each of the central connecting grooves has groove volume (V6) in a range of from 52% to 62% of a virtual groove volume (V0) of the concerned central connecting groove,
wherein the virtual groove volume (V0) is measured when assuming that the concerned central connecting groove has a constant reference depth that is the same as the lateral inclined grooves to which the concerned central connecting groove is connected.

3. The pneumatic tire according to claim 1, wherein each of the central connecting grooves has a depth (D6$_2$) at the second end, and the depth (D6$_2$) of the second end is in a range of from 4% to 24% of the depths (D3) of the lateral inclined grooves.

4. The pneumatic tire according to claim 1, wherein the tread portion comprises a row of central blocks which are divided by the lateral inclined grooves, the connecting inclined grooves and the central connecting grooves, and the central blocks are provided with sipes extending substantially in a tire axial direction.

5. The pneumatic tire according to claim 1, wherein in a tire cross-section of a 5% inner pressure state in which the tire is mounted on a standard wheel rim with 5% pressure of a standard inner pressure, a tread profile of a surface of the tread portion comprises:
   a first arc portion having a radius (R1) of curvature with the center located on a tire equatorial plane,
   a second arc portion having a radius (R2) of curvature connected to the first arc portion at an intersection point (Q1) and
   a third arc portion having a radius (R3) of curvature connected to the second arc portion at an intersection point (Q2),
   wherein
      the radius (R2) of curvature is in a range of from 50% to 54% of the radius (R1) of curvature, and the radius (R3) of curvature is in a range of from 20% to 24% of the radius (R1) of curvature;
      a distance (L1) from the tire equator to the intersection point (Q1) is in a range of from 40% to 50% of a tread half width (TW) which is an axial distance from the tire equator to one of the tread edges; and
      a distance (L2) from the tire equator to the intersection point (Q2) is in a range of from 75% to 80% of the tread half width TW.

6. The pneumatic tire according to claim 1, wherein the connecting inclined grooves comprise axially inner connecting inclined grooves and axially outer connecting inclined grooves, and the tread portion comprises
   a row of middle blocks which are divided by the lateral inclined grooves, the inner connecting inclined grooves, and the outer connecting inclined grooves and
   a row of shoulder blocks which are divided by the lateral inclined grooves, the outer connecting inclined grooves, and one of the tread edges,
   wherein
      the middle blocks are provided with sipes extending substantially parallel with the inner connecting inclined grooves, and
      the shoulder blocks are provided with sipes extending substantially perpendicular to the outer connecting inclined grooves.

7. The pneumatic tire according to claim 1, wherein a bottom of each central connecting groove forms a slant surface inclined at a constant angle so that the depth of each central connecting groove decreases from the first end to the second end at a fixed ratio.

8. The pneumatic tire according to claim 2, wherein a bottom of each central connecting groove forms a slant surface inclined at a constant angle so that the depth of each central connecting groove decreases from the first end to the second end at a fixed ratio.

9. The pneumatic tire according to claim 3, wherein a bottom of each central connecting groove forms a slant surface inclined at a constant angle so that the depth of each central connecting groove decreases from the first end to the second end at a fixed ratio.

10. The pneumatic tire according to claim 1, wherein a bottom of each central connecting groove forms a curved surface in a convex arc manner or concave arc manner.

11. The pneumatic tire according to claim 1, wherein a bottom of each central connecting groove forms a stepped surface having three or more steps so that the depth of each central connecting groove decreases stepwise.

* * * * *